UNITED STATES PATENT OFFICE.

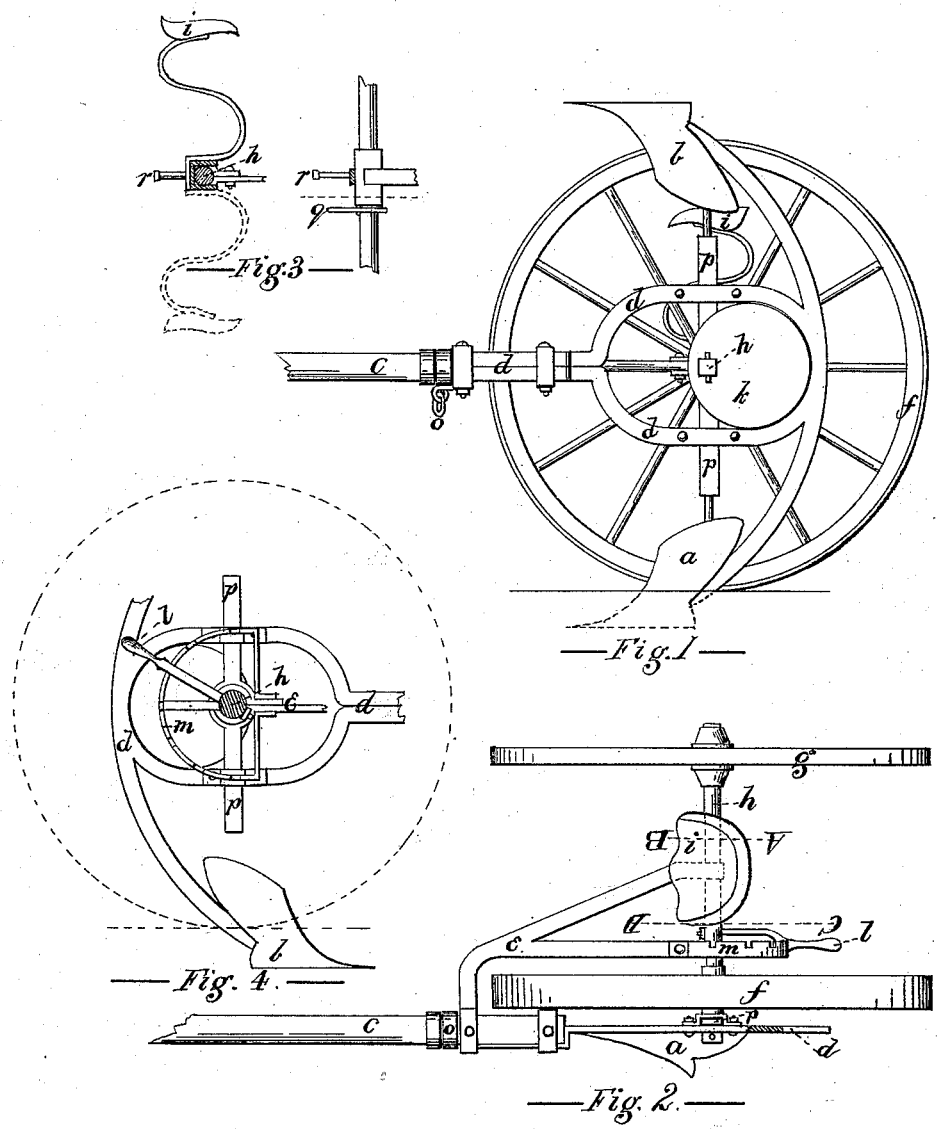

WILLIAM D. ARNETT, OF JEFFERSON COUNTY, COLORADO.

IMPROVEMENT IN SULKY-PLOWS.

Specification forming part of Letters Patent No. 209,374, dated October 29, 1878; application filed March 5, 1878.

*To all whom it may concern:*

Be it known I, WILLIAM D. ARNETT, of Jefferson county, State of Colorado, have invented a new and useful Improvement in Sulky-Plows, which improvement is fully set forth in the following specification and accompanying drawings, in which—

Figure 1 is a side view; Fig. 2, a top view; Fig. 3, a section on line A B, Fig. 2; and Fig. 4, a section on line C D, Fig. 3.

My invention consists of a sulky-plow with, first, an improved attachment for regulating the depth of furrow; second, constructed so that both wheels shall run upon the unplowed ground; third, constructed so that either a right or left hand plow may be attached thereto at will; and, fourth, so constructed that both a right and left hand plow may be attached thereto, as shown in drawing, for the purpose of hill-side plowing, or for the purpose of plowing all one way, which is of great importance where fields are irrigated.

In the drawing, $a$ is a left-hand plow; $b$, a right-hand plow; $c$, the draft-pole; $d$, the beams or frames which connect the plows with the draft-pole; $e$, the frame-work which connects the draft-pole with the axle; $f$, a broad-tread wheel; $g$, a very light wheel; $h$, the axle of wheels $f$ $g$; $i$, the driver's seat.

The depth of furrow is regulated in my machine, whether used as an ordinary sulky-plow or a hill-side plow, by means of the eccentric-wheel $k$, which is attached to the axle $h$, as shown, and turns with said axle. Changing the position of the eccentric-wheel $k$, as will be seen by the drawings, lowers or raises the frames or beams $d$, and thereby the plow which is in the ground. The position of the said wheel $k$ is fixed, when set, by means of the lever $l$ and ratchet $m$, as shown on drawings.

The advantages of both wheels of my machine running upon the unplowed ground is that a uniform depth of furrow is obtained. The facility with which I attach either a right or left hand plow to my machine is of great advantage, as it is often desirable to do so, and saves the use of an extra plow.

Used for hill-side work, or when the earth is to be turned all one way, my plow is operated as follows: The plow being set in the position shown in the drawings, with both plows attached, (plow $a$ being in the ground,) when drawn forward, casts the earth to the left. At the end of the field or furrow the entire machine is turned over, and then turned around, which places the plow $b$ in the ground, casting the earth to the right.

In order that the upsetting of the machine may not interfere with the movement of the horses, the ring $o$, to which the double-trees are attached, is made to turn upon the draft-pole, thus always keeping the double-tree below the draft-pole. The slide-bars $p$, fitted to the axle with a collar, and working in the guides secured to the frame or beams $d$, sustain in part the draft and hold the plows in position firmly.

Fig. 3 shows the construction of the driver's seat, whereby it is reversed when the machine is reversed, as above described.

Raising the clasp or hook $q$, the seat may be pushed back upon the pin $r$ until it turns upon said pin, when it is pushed up close to the axle $h$, about which the clasp $q$ is again secured.

Having thus described my invention, what I claim as new, and desire to secure by Letters Patent, is—

1. The combination of the eccentric-wheel $k$ with the frames or beams $d$, axle $h$, lever $l$, and ratchet $m$, for the purpose of regulating the depth of the furrow.

2. In a reversible sulky-plow, the combination of a right and left hand plow, an axle, $h$, and wheels $f$ $g$, whereby the entire implement is adapted to be turned over, as described, and for the purposes set forth.

3. A reversible driver's seat, in combination with the axle $h$, arranged to turn over and be secured in the desired position by means of a clamp, as shown.

4. The slide-bars $p$, in combination with the axle $h$, lever $b$, frames or beams $d$, and reversible plows $a'$ $b'$, as and for the purposes described.

WILLIAM D. ARNETT.

Witnesses:
ROBERT S. ROESCHLAND,
MORTIMER ARNOLD.